No. 827,305. PATENTED JULY 31, 1906.
H. GROSS.
MACHINE FOR CUTTING CHEESE.
APPLICATION FILED NOV. 1, 1905.

3 SHEETS—SHEET 1.

Witnesses:
Arthur Zumpe
William Schultz

Inventor
Heinrich Gross
by Hauck v Briesen Atty.

No. 827,305. PATENTED JULY 31, 1906.
H. GROSS.
MACHINE FOR CUTTING CHEESE.
APPLICATION FILED NOV. 1, 1905.

3 SHEETS—SHEET 2.

Witnesses:
Arthur Zumpe
William Schulz

Inventor
Heinrich Gross
by Hauer v Briesen Atty

No. 827,305. PATENTED JULY 31, 1906.
H. GROSS.
MACHINE FOR CUTTING CHEESE.
APPLICATION FILED NOV. 1, 1905.
3 SHEETS—SHEET 3.
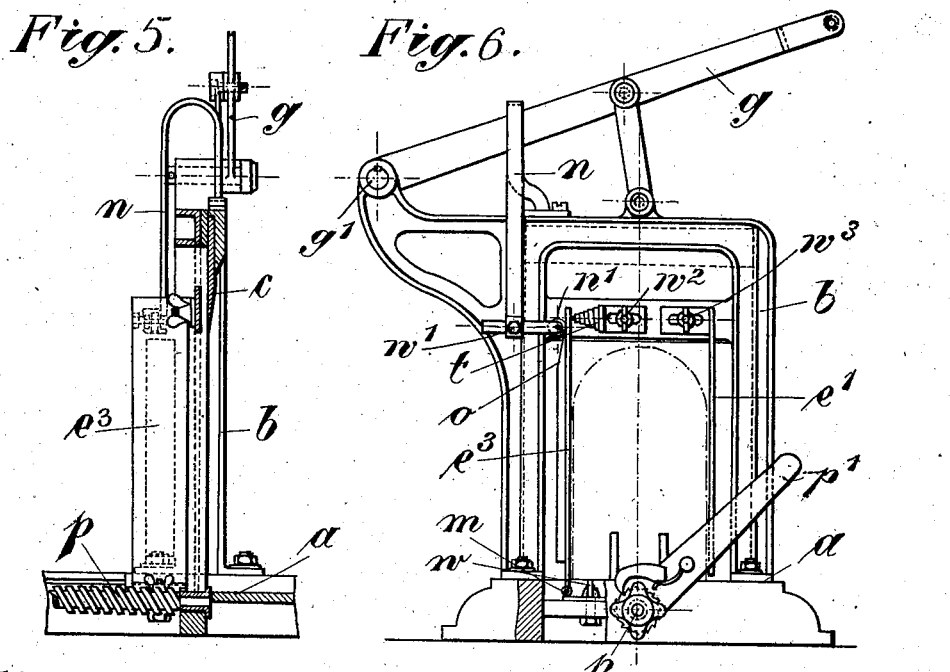

UNITED STATES PATENT OFFICE.

HEINRICH GROSS, OF DÜSSELDORF, GERMANY.

MACHINE FOR CUTTING CHEESE.

No. 827,305.  Specification of Letters Patent.  Patented July 31, 1906.

Application filed November 1, 1905. Serial No. 285,372.

*To all whom it may concern:*

Be it known that I, HEINRICH GROSS, a citizen of Germany, residing at Düsseldorf, Germany, have invented new and useful Improvements in Machines for Cutting Cheese, of which the following is a specification.

This invention relates to a machine for cutting cheese and similar articles which is so constructed that the cheese is held in position and prevented from breaking or crumbling while being cut.

Figure 1:
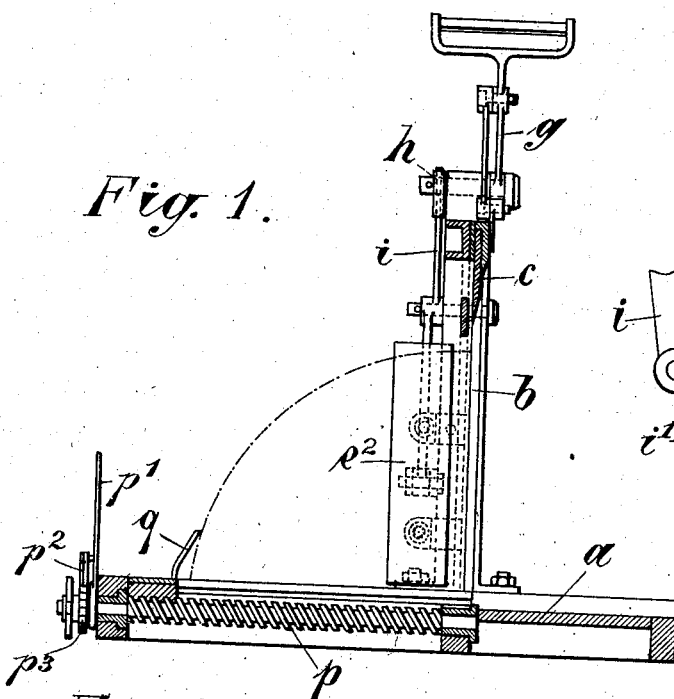
Figure 2:
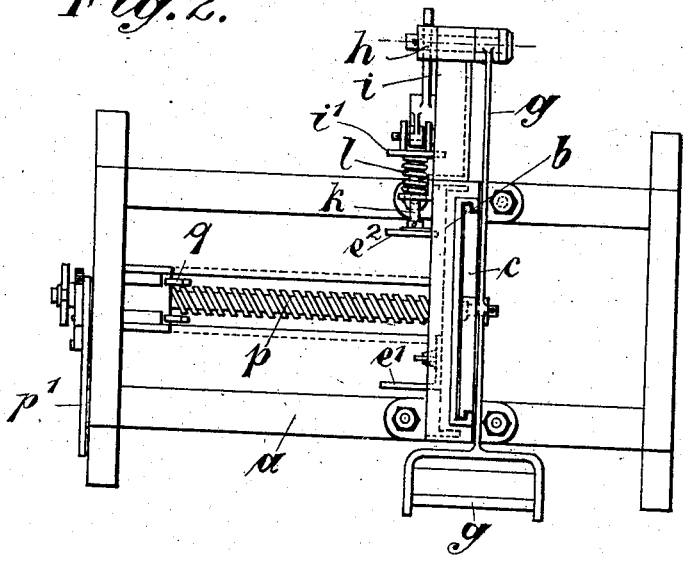
Figure 3:
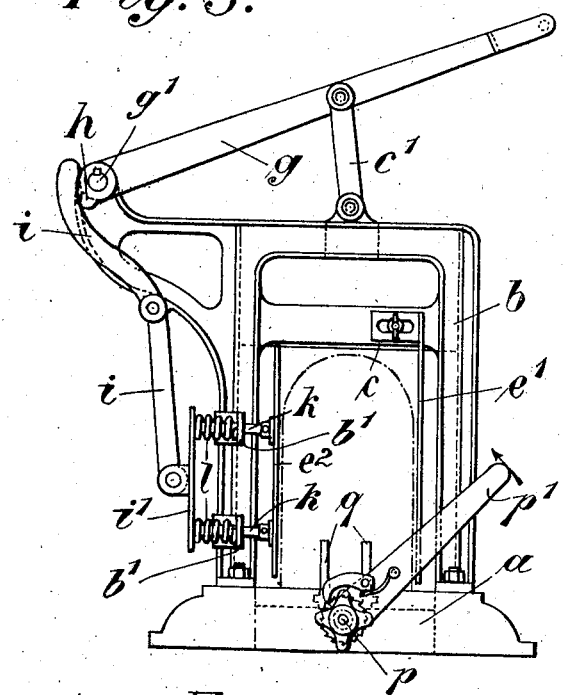
Figure 4:
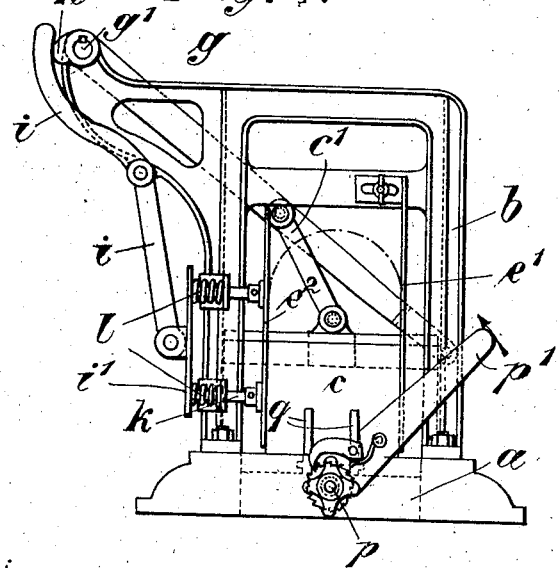

In the accompanying drawings, Figure 1 is a side view, partly in section, of my improved machine for cutting cheese; Fig. 2, a plan of Fig. 1; Fig. 3, a front view of Fig. 1; Fig. 4, a view similar to Fig. 3, showing the parts in a different position; Fig. 5, a side view, partly in section and partly broken away, of a modification; Fig. 6, a front view thereof, and Fig. 7 a detail showing the means for adjusting the movable plate.

The letter $a$ indicates the bed-plate of my improved cheese-cutting machine, supporting a frame $b$. Within the latter is slidable the knife or cutter $c$, which receives vertical reciprocating movement by a hand-lever $g$, fulcrumed to frame $b$ at $g'$ and connected to cutter $c$ by a link $c'$. The cheese A is supported upon bed-plate $a$ and may be advanced by a feed-slide $q$, engaged by a screw-spindle $p$, which is operated by a hand-lever $p'$ through a spring-influenced pawl $p^2$, engaging a ratchet-wheel $p^3$, fast on spindle $p$.

During the cutting operation the cheese is held against lateral movement by a pair of clamping-plates $e'$ $e^2$, of which plate $e'$ is laterally adjustable, while plate $e^2$ is reciprocated by lever $g$ in the following manner: Lever $g$ is provided with a nose $h$, adapted to engage the upper arm of a double lever $i$, the lower arm of which is pivoted to a plate $i'$. The latter is connected to plate $e^2$ by pins $k$, guided in bearings $b'$ of frame $b$. Springs $l$ tend to draw plate $e^2$ outward, so as to release the cheese. When handle $g$ is depressed to lower cutter $c$, nose $h$ will engage lever $i$ and tilt the latter in such a manner that plate $e^2$ is pressed inwardly against the cheese. After the handle $g$ has been raised to elevate the cutter nose $h$ will clear lever $i$, and springs $l$ will withdraw plate $e^2$ from the cheese and permit the latter to be advanced by slide $q$.

In Figs. 5 and 6 a movable plate $e^3$ is pivoted to bed-plate $a$ at $m$ and is provided with a longitudinal rail $o$. The latter is adapted to be engaged by an adjustable roller $n'$ of a slide $n$, attached to cutter $c$ or lever $g$. By depressing the latter roller $n'$ will swing plate $e^3$ inward against the action of a spring $t$, while upon the completion of the upstroke of lever $g$ roller $n'$ will clear rail $o$ and permit spring $t$ to tilt plate $e^3$ outward. Screws $w$, $w'$, and $w^2$ permit the plate $e^3$ to be adjusted to larger or smaller heads of cheese, while plate $e'$ may be set by clamp-screw $w^3$.

Figure 7:
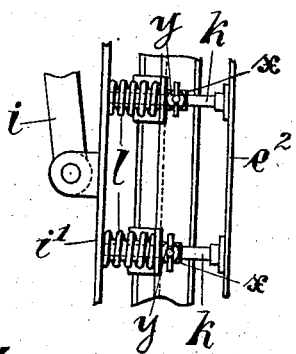

In Fig. 7 pins $k$ of plate $e^2$ are embraced by tubes $x$ of plate $i'$, so that the distance between plates $i'$ and $e^2$ may be readily adjusted by set-screws $y$.

What I claim is—

A machine for cutting cheese provided with a vertically-reciprocating cutter, a clamping-plate, a feed-slide, and a hand-lever operatively connected to the cutter and plate, substantially as specified.

Signed by me at Düsseldorf, Germany, this 7th day of October, 1905.

HEINRICH GROSS.

Witnesses:
 WILLIAM ESSENWEIN.
 ERNEST ANDRÉ.